N. F. POTTER.
Peat Machine.

No. 47,564.

Patented May 2, 1865.

UNITED STATES PATENT OFFICE.

NATHANIEL F. POTTER, OF PROVIDENCE, RHODE ISLAND.

IMPROVED APPARATUS FOR PREPARING PEAT FOR FUEL.

Specification forming part of Letters Patent No. 47,564, dated May 2, 1865.

*To all whom it may concern:*

Be it known that I, NATHANIEL F. POTTER, of the city and county of Providence, in the State of Rhode Island, have invented a new and useful Improvement in Machine for Preparing Peat for Fuel; and I do hereby declare that the following specification, taken in connection with the drawings making a part of the same, is a full, clear, and exact description thereof.

Figure 1:
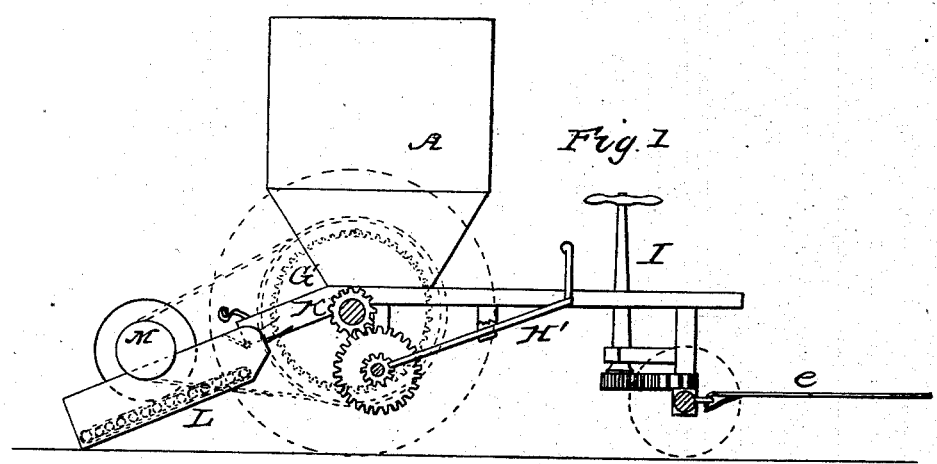
Figure 2:
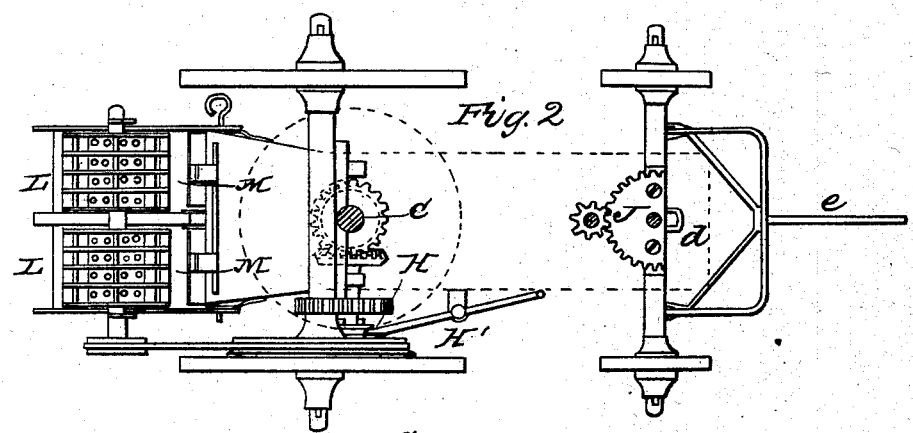
Figure 3:
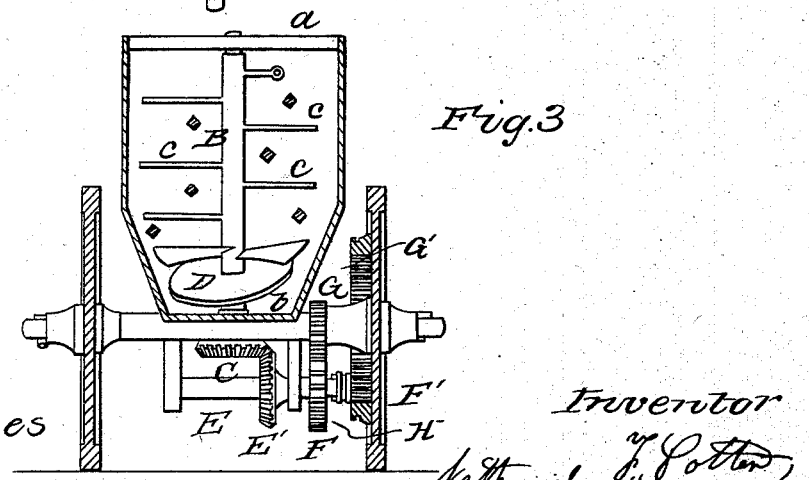

Figure 1 is a side elevation of my machine. Fig. 2 is a plan. Fig. 3 is a front view, partly in section and partly in perspective.

The purpose of the machine which is the subject of this patent is to prepare, in a convenient form for fuel, peat which has been already tempered and deprived of the greater portion of the undecomposed vegetable fiber, which, in its natural state, is found to exist in large quantities in it. While, however, I propose to use the machine in connection with another machine for tempering peat and separating from it the said fibrous material, for which Letters Patent have been granted to me of even date herewith, yet it is not indispensably necessary that the peat should have been subjected to the action of the last-named machine, although, in such case, the result is much more satisfactory.

Another purpose of my invention is to deposit the peat in convenient layers for drying the same without the intervention of hand labor.

In the accompanying drawings, A, Fig. 1, represents a tub capable of holding about two tons of peat, and similar in form to the ordinary pug-mill for working clay for bricks. Through the central axis of this tub is arranged a shaft, B, Fig. 3, which has a journal-bearing in a suitable frame-work, a, across the top of the tub at the upper end, and is supported by a shoulder, b, near the lower end. The shaft extends through the bottom of the tub and has attached to its extremity a toothed bevel-wheel, C, as shown. From the shaft B radiate blades or cutters c c c, the office of which is to break up and temper the mass of peat in the tub, and may be of any preferred shape. There is also upon this shaft and near to the bottom a cutter, D, arranged upon the principle of a propeller-blade, and which, as the shaft B turns in one direction, will give an upheaval tendency to the mass of peat in the tub, and with the knives c c act to temper it, but when turned in the opposite direction will force the peat through the delivery-duct K, preparatory to being deposited in layers for drying, as hereinafter to be explained.

The whole apparatus is mounted upon a wheel-carriage, as shown, and is so arranged that the central shaft, B, can be made to revolve in either direction as the carriage travels, for the purpose of tempering the peat or of delivering it, as may be desired. This is effected, in the present instance, by means of the shaft E, located directly beneath the hinder axle-tree of the carriage, which carries a bevel gear-wheel, E', which engages with the bevel gear-wheel C.

F and F' are loose pinions upon the shaft, the teeth of the former engaging with the teeth of the wheel G, and the teeth of the latter with the gear G', (shown in dotted lines, Fig. 1,) upon the wheel of the carriage. A clutch, H, operated by the lever H', will, at the pleasure of the operator, hold either the pinion F or F' fast upon the shaft E, when, as a necessary result, motion will be communicated to the shaft B, and in the one direction or in the other, according to which of the two pinions is held fast by the clutch.

It is obvious from the relative sizes of these pinions and gear-wheels shown that the shaft B will be made to revolve in one direction much faster than in the other. Thus, when the peat is being tempered the shaft B will only make one-half a revolution for one revolution of the axle of the carriage, while, when the peat is being delivered, it will make five revolutions for one of the axle.

If the clutch is placed midway between the two pinions F and F' the carriage can be moved over the surface of the ground without putting the shaft B in motion.

Various other arrangements for communicating motion to the shaft B and for reversing its motion can be easily made, but the one which I have exhibited answers the purpose effectually, though I think that it will be found preferable to obtain the power from both carriage-wheels instead of, as in the instance shown, from one only.

I have represented at Figs. 1 and 2 an upright shaft, I, passing through the platform of the carriage, with a toothed wheel upon its lower end, which engages with the teeth of the toothed segment J upon the fore axle. The object of this is to enable the operator to give the proper direction to the machine when it is propelled by power derived from the engine through a drag-rope hitched to the staple d.

The tongue e can be used and a pair of horses employed to work the machine when it is to be moved from place to place or when tempering the peat, especially as I design that the gears for operating the shaft B to perform the tempering shall not in practice be connected, except when the machine is placed upon a tramway or suitable road-bed, when the mere friction arising from the weight of the load will be greatly diminished. But in delivering the peat in layers for drying it is necessary that the carriage should be moved at a very slow rate of speed, but with great uniformity, and as this is impracticable without the aid of mechanical power capable of regulation, I have shown both modes, which I intend for the purposes named to employ.

Another feature of my invention is the means for delivering the peat in layers for drying. I accomplish this by means of the action of the propeller-blades when made to move in the right direction in forcing the peat through the delivery-spout K, Fig. 1, upon one or more endless aprons, L L, in a continuous sheet or sheets, in combination with a cylinder, M, whose surface is provided with cells of a convenient size to cut the sheet into the form of cakes of the desired dimensions. This cylinder is hung in bearings directly over the endless apron L and is driven by a belt passing from a pulley on the axle of the carriage over a pulley upon the shaft of the cylinder, and as it revolves its weight causes the partitions which form the cells to be forced into the sheet of peat and cause it to be shoved along the endless apron and delivered upon the floor of the drying-yard. It would be practicable to cause these partitions to cut clean through the sheet of peat and thus form the same into blocks of the shape of bricks, but it will practically be found to be more convenient to use this cylinder for the purpose of marking to a depth of one-half its thickness the sheet of peat, and it can afterward be easily broken upon these lines into the suitable size for fuel.

The method which I employ, or its equivalent, for delivering the peat mechanically I consider of great importance as affecting the economy of the article, for the reason that before peat is fit to be used for fuel it must be deprived of the water with which it is completely saturated, and as no means is so effectual for this purpose as that of atmospheric evaporation, it is necessary to spread it upon a floor, and the contents of a single tub like that shown in the drawings, having a capacity of two tons, will cover a space of ten by one hundred and twenty feet.

What I claim as my invention, and desire to secure by Letters Patent, is—

1. The combination of a mill for tempering peat, as described, with a movable carriage, for the purposes specified.

2. The combination of the clutch H with the pinions F F' and the toothed gears G G', for the purpose of imparting motion to the shaft B in either direction, as desired, for the purposes specified.

3. The combination of the endless apron L with a cylinder whose surface is provided with cells, or its equivalent, substantially as described, for the purposes specified.

NATHANIEL F. POTTER.

Witnesses:
  JOHN D. THURSTON,
  JOHN H. STINESS.